United States Patent [19]

Kolesinski et al.

[11] 4,016,340

[45] Apr. 5, 1977

[54] HYDROXYL-CONTAINING POLYMERS HAVING AMINIMIDE GROUPS ATTACHED THERETO THROUGH AN ETHER LINKAGE

[75] Inventors: Henry S. Kolesinski, Burlington; Avinash C. Mehta, Belmont; Lloyd D. Taylor, Lexington, all of Mass.

[73] Assignee: Polaroid Corporation, Cambridge, Mass.

[22] Filed: Aug. 7, 1975

[21] Appl. No.: 602,598

[52] U.S. Cl. .................................... 526/7; 96/113; 96/114; 260/117; 526/9; 526/11; 528/501; 536/43; 536/50; 536/114

[51] Int. Cl.² ................... C08F 8/30; C08B 15/06; C08B 31/08; C08B 37/04

[58] Field of Search ............... 260/91.3 VA, 231 R, 260/231 A, 231 CM, 209.6, 233.3 R, 232, 209 R, 117, 215; 526/7, 9, 11; 536/43, 50, 114

[56] References Cited

UNITED STATES PATENTS

| 3,681,079 | 8/1972 | Fitzgerald | 96/114 |
| 3,816,129 | 6/1974 | Fitzgerald | 96/114 |

*Primary Examiner*—Stanford M. Levin
*Attorney, Agent, or Firm*—Philip G. Kiely

[57] ABSTRACT

This invention relates to novel polymers containing a plurality of hydroxyl groups having aminimide groups attached thereto through an ether linkage and to methods for attaching said aminimide groups onto said polymers containing a plurality of hydroxyl groups.

12 Claims, 6 Drawing Figures

FIG. I

HYDROXYL-CONTAINING POLYMERS HAVING AMINIMIDE GROUPS ATTACHED THERETO THROUGH AN ETHER LINKAGE

BACKGROUND OF THE INVENTION

Hydroxyl-containing polymers such as polyvinyl alcohol and cellulose that have been alkylated to form ethers, for example such as cellulosic ethers, are well known to the art and possess wide utility. Hydroxyalkyl and carboxyalkyl derivatives are two particular classes of such substituted cellulosic products. The type of substituting groups, number of such groups per anhydroglucose unit and the method of preparing such substituted products provides a wide range of physical and chemical properties.

A novel process has now been found for preparing a new class of substituted polymers containing a plurality of hydroxyl groups having aminimide groups attached through either linkages as well as a new class of crosslinked film-forming materials.

SUMMARY OF THE INVENTION

The present invention is directed to novel polymers containing a plurality of hydroxyl groups having aminimide groups attached thereto. The present invention is also directed to methods for preparing such polymers.

DETAILED DESCRIPTION OF THE INVENTION

Figure 1:
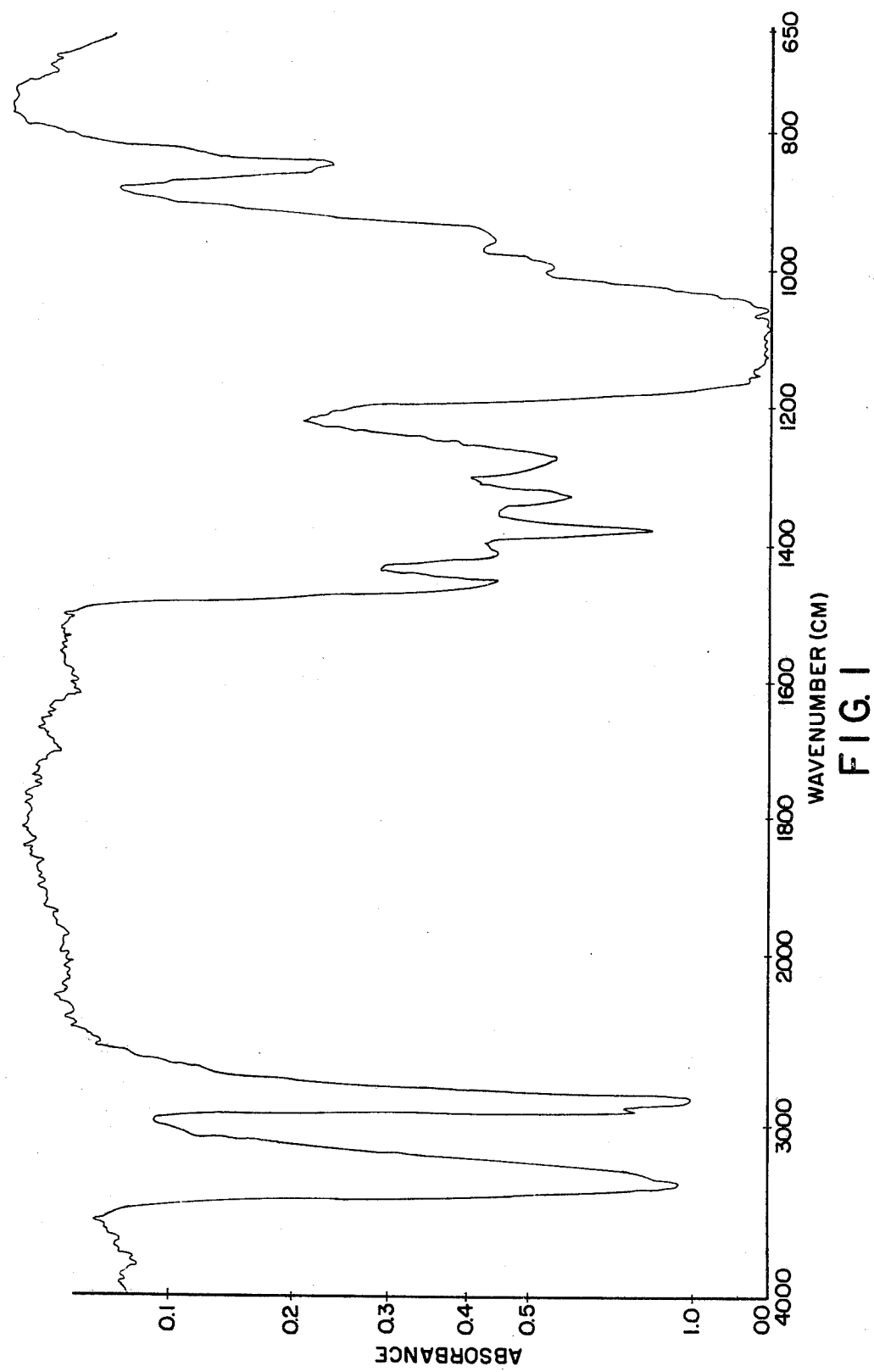
FIG. 1 is an infrared spectrograph of hydroxypropyl cellulose.

The novel compounds of the present invention comprise aminimide-substituted derivatives of polymers containing a plurality of hydroxyl groups and are prepared by reacting said polymers with a compound of the formula:

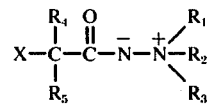

wherein each $R_1$, $R_2$ and $R_3$ are alkyl groups; X is chloro, iodo or bromo; and each $R_4$ and $R_5$ are hydrogen, lower alkyl and phenyl. The aminimide group

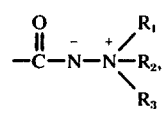

is preferably introduced into the hydroxyl-containing polymer by alkylation with tertiary amine α-halocarboximides of one or more of the hydroxyl groups to form ether linkages. It should be understood that all of the hydroxyl groups on the hydroxyl-containing polymer are available for the reaction. For example, in a preferred embodiment, wherein the hydroxylcontaining polymer is a cellulosic product, the hydroxyl group or groups at which the reaction takes place may be the hydroxyl group on the anhydraglucose unit and/or the hydroxyl of a substituent such as an hydroxyalkyl group.

As examples of hydroxyl-containing polymers contemplated by the present invention, mention may be made of the following:

cellulose
carboxymethyl cellulose
hydroxyethyl cellulose
methylcellulose
hydroxypropyl cellulose
ethyl cellulose
methyl hydroxyethyl cellulose
carboxymethyl hydroxyethyl cellulose
hydroxypropylmethyl cellulose
alginic acid
cellulose sulfate
kappacarrageenan
lambda carrageenan
soluble starch
gelatin
polyvinyl alcohol It should also be understood that the term "polymers containing a plurality of hydroxyl groups" and "hydroxyl-containing polymers" include both homopolymers and copolymers as well as mixtures of such polymers.

Representative novel aminimide-substituted polymers within the scope of the present invention include the following:

A.

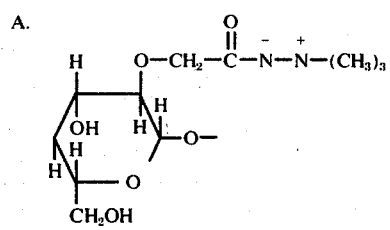

B. 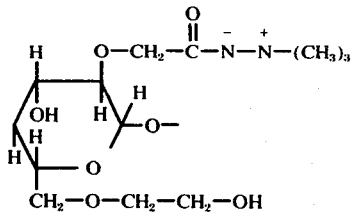

C. 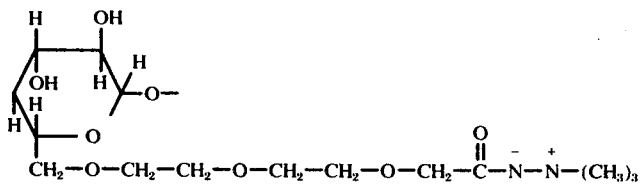

D. 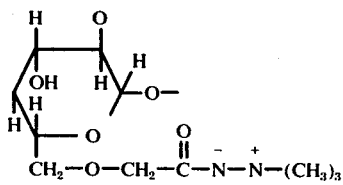

E. 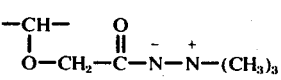

Compound A is based on cellulose as a starting material, compounds B and C on hydroxyethylcellulose and compound D on hydroxypropyl cellulose. Compound E is based on polyvinyl alcohol.

It should be understood that in the case of the cellulosics, the location of the hydroxyalkyl groups and the aminimide groups are representative, since, as it is known in the art, the hydroxyalkyl groups may be introduced into the cellulose molecule in two ways: one; at the hydroxyls of the cellulose chain or two; at hydroxyls of substituents of previously substituted hydroxyls to form a side chain. In addition, theoretically, all hydroxyl positions can be substituted. Similarly, the aminimide group may be introduced into one or more of the hydroxyls of the cellulose molecule or the hydroxyls of the hydroxyalkyl groups.

The novel process of the present invention comprises the steps of swelling the polyhydroxyl-containing polymer in an organic solvent containing base and adding the above-described haloacetimide. It should be understood that the term "organic solvent" includes combinations of organic solvents as well as single organic solvents which will both swell the cellulosic starting material and dissolve the haloacetimide.

The haloacetimides employed in the present invention are set forth in greater detail in application Ser. No. 602,600 filed concurrently herewith, and which is incorporated herein by reference.

The following non-limiting examples illustrate the preparation of the novel compounds of the present invention.

EXAMPLE 1

In a flask fitted with a stirrer, nitrogen inlet, condenser and drying tube, potassium t-butoxide is prepared by dissolving 0.468g of potassium in 20 ml. of t-butanol. After the evolution of hydrogen has subsided, the solution is covered with a blanket of nitrogen and 1,344g of hydroxypropyl cellulose (sold by Hercules, Inc., Wilmington, Delaware under the trade name KLUCEL J) and 20 ml. of dimethylformamide is added. The mixture was allowed to steep for one hour at room temperature. A solution of 1.8g of trimethylamine α-chloroacetimide

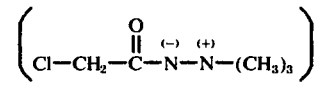

in 20ml. of t-butanol was then added and the mixture stirred at room temperature for 20 hours. The polymer was isolated by precipitation into hexane containing acetic acid and dried under vacuum. The polymer was redissolved in water and dialyzed in a cellophane membrane for 120 hours and then isolated by freeze drying. Proof of aminimide substitution was obtained by infrared spectra.

To further characterize the aminimide substituted products, the dialyzed material (without the freeze-drying step) was heated on a steam cone. A polymer fraction which will be designated A precipitated, was separated and analyzed. The supernatant was retained and designated B. Fraction A represented a cellulosic polymer having a low degree of aminimide substitution and, therefore, the less-soluble fraction. Fractions A and B were freeze-dried and subjected to nitrogen analysis and thermogravimetric analysis. Fraction A was found to contain 1.4% nitrogen and showed a 2.3% weight loss attributed to the elimination of trimethylamine.

Fraction B, which by its solubility indicated a higher degree of aminimide substitution, was also subjected to nitrogen analysis and thermogravimetric analysis. The polymer fraction was found to contain 7% nitrogen and a weight loss attributed to the elimination of trimethylamine of 14.5%. The analyses correspond to a degree of substitution of 1.

Figure 2:
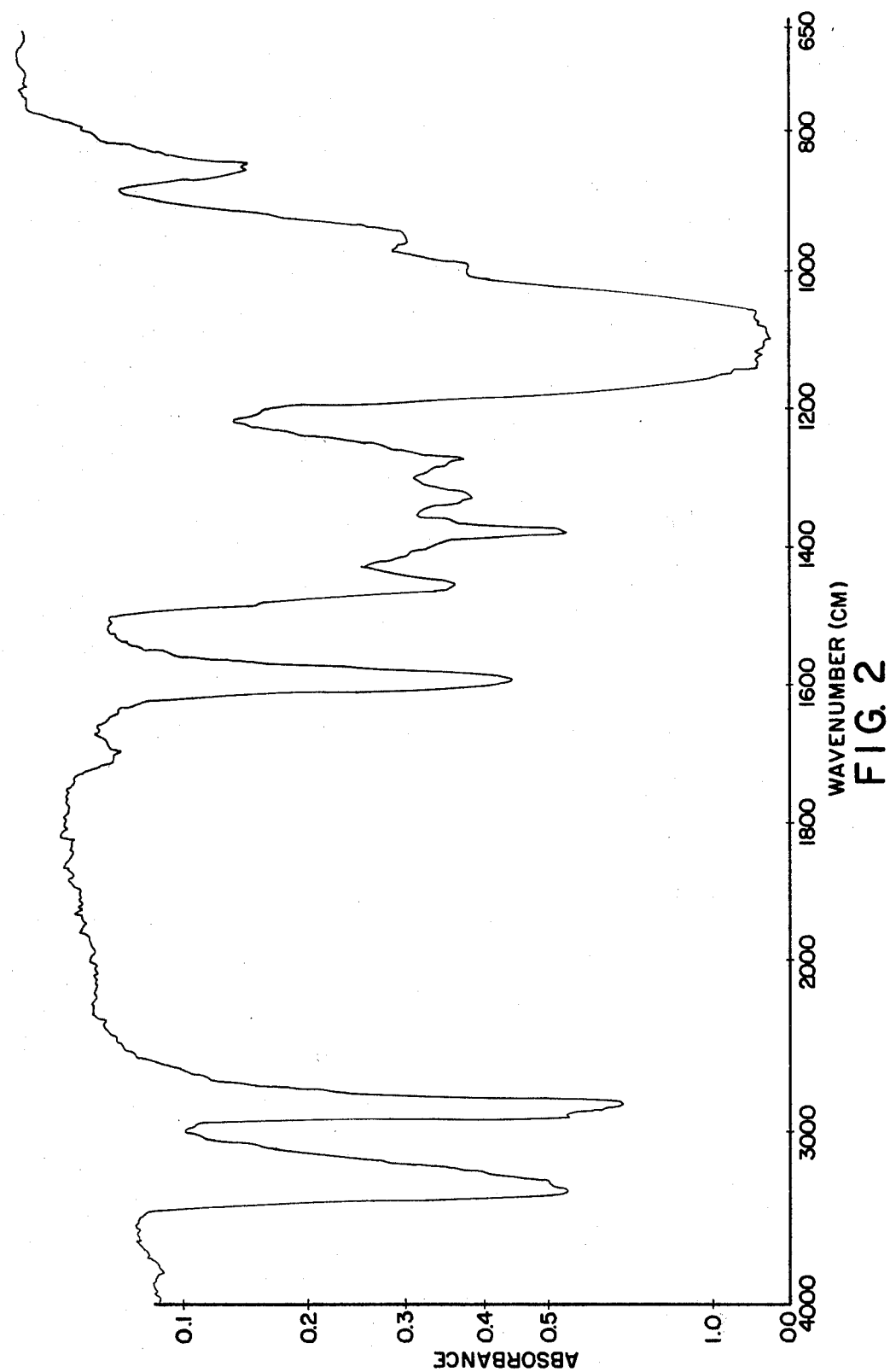
FIG. 2 is an infrared spectrograph of an aminimide-substituted hydroxypropyl cellulose polymer within the scope of the present invention.
Figure 3:
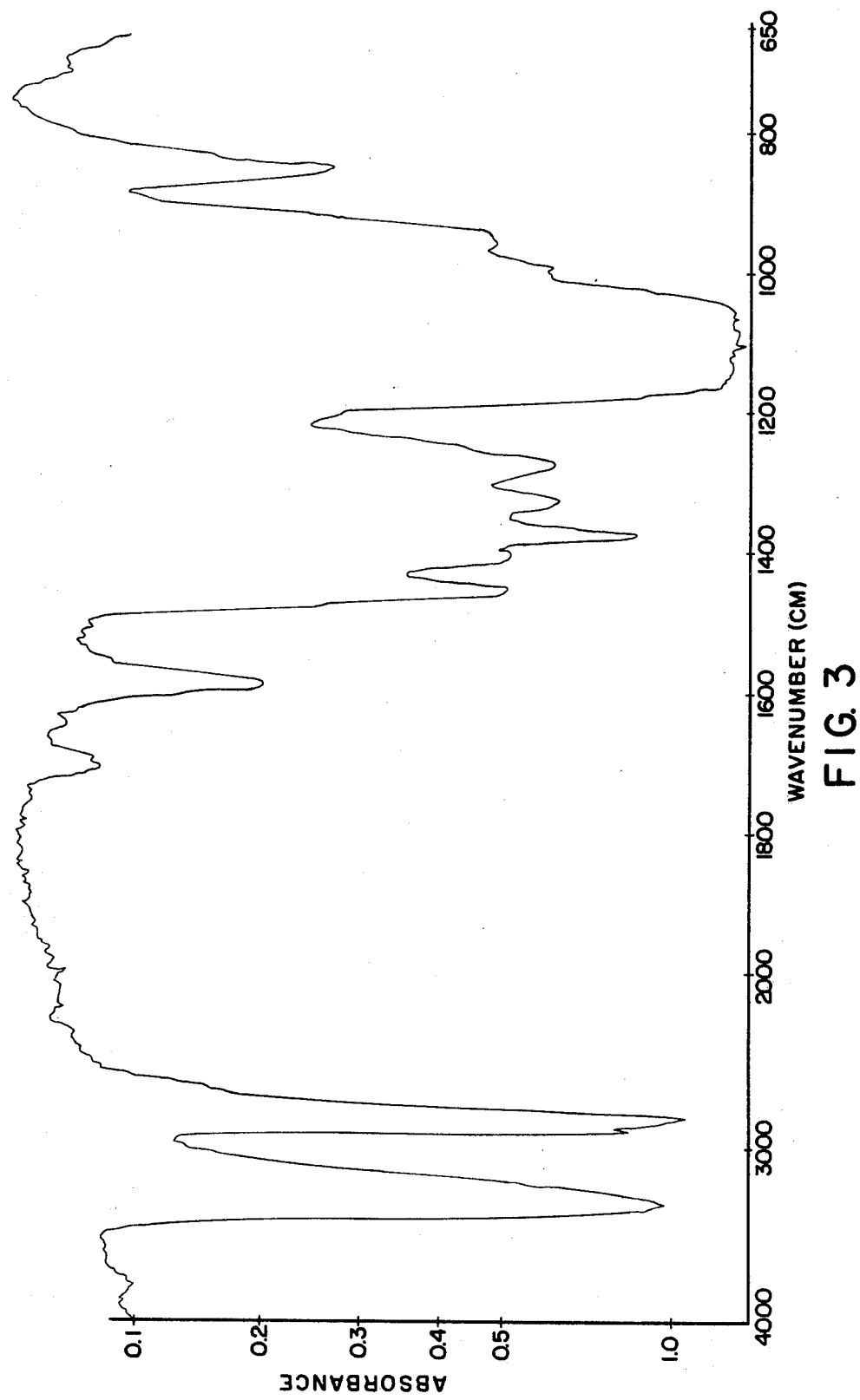
FIGS. 3 and 4 are infrared spectrographs of a less soluble and a more soluble fraction, respectively, of the polymer represented in FIG. 2.
Figure 4:
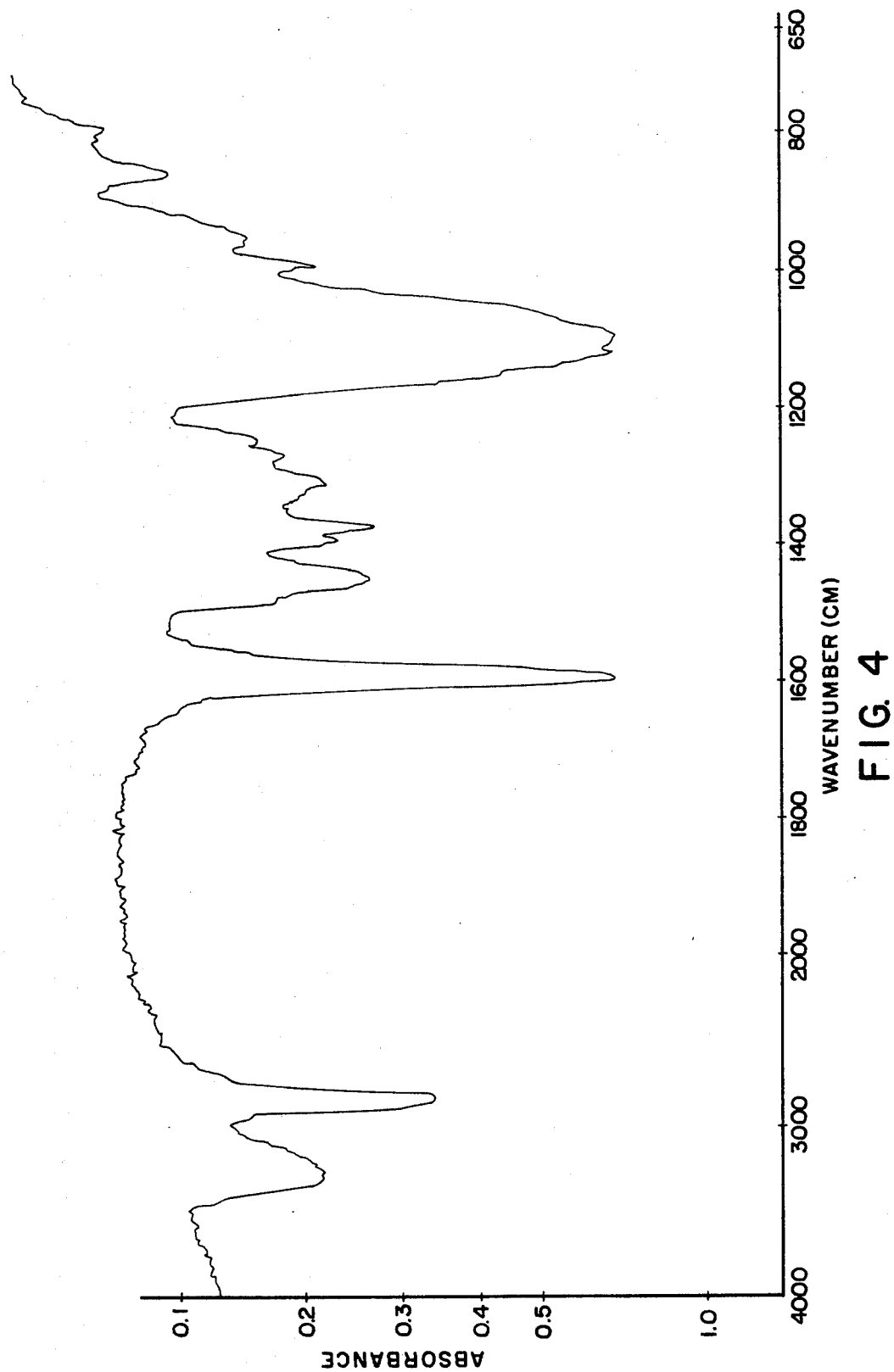

Turning now to the figures, FIG. 1 is an infrared spectrograph of the hydroxypropyl cellulose employed in Example 1. FIG. 2 is a spectrograph of the product of Example 1 after dialysis, while FIGS. 3 and 4 are spectrographs of Fractions A and B, respectively. The band at 1595 CM$^{-1}$ represents the aminimide groups substituted on the hydroxypropyl cellulose.

Figure 5:
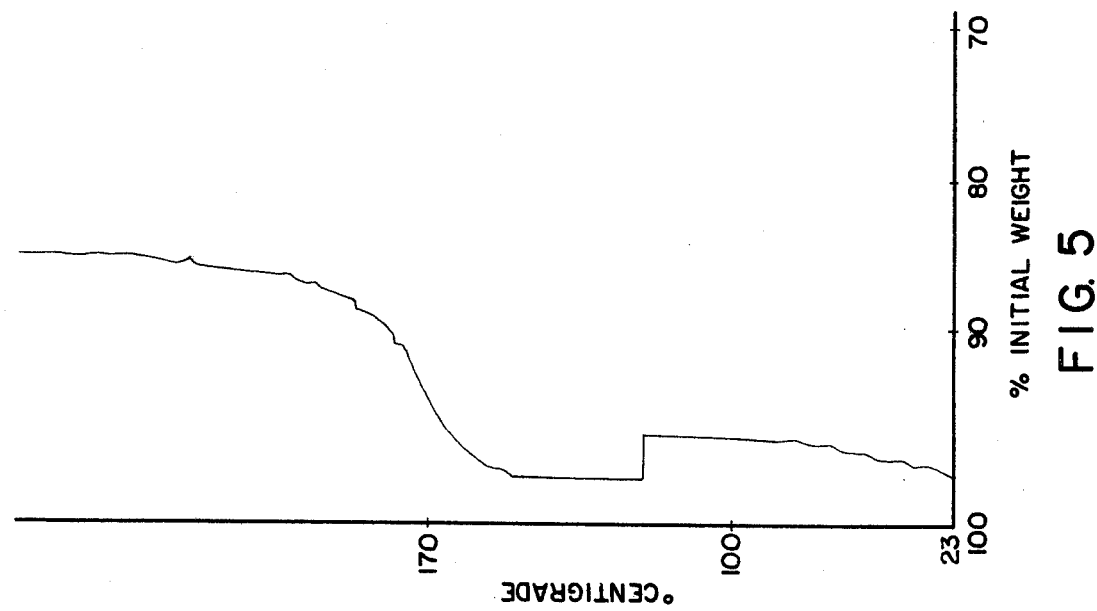
FIG. 5 is a thermogravametric analysis trace of an aminimide-substituted polymer within the scope of the present invention.

FIG. 5 is a thermogravimetric trace of polymer Fraction B. The polymer was heated to dry the polymer and then the scale readjusted to 100% initial weight. Heating was then continued at a rate of 10° C per minute until 170° C was reached. The temperature was held at 170° C until deamination ceased. The weight loss due to trimethylamine amounted to 14.5%.

Figure 6:
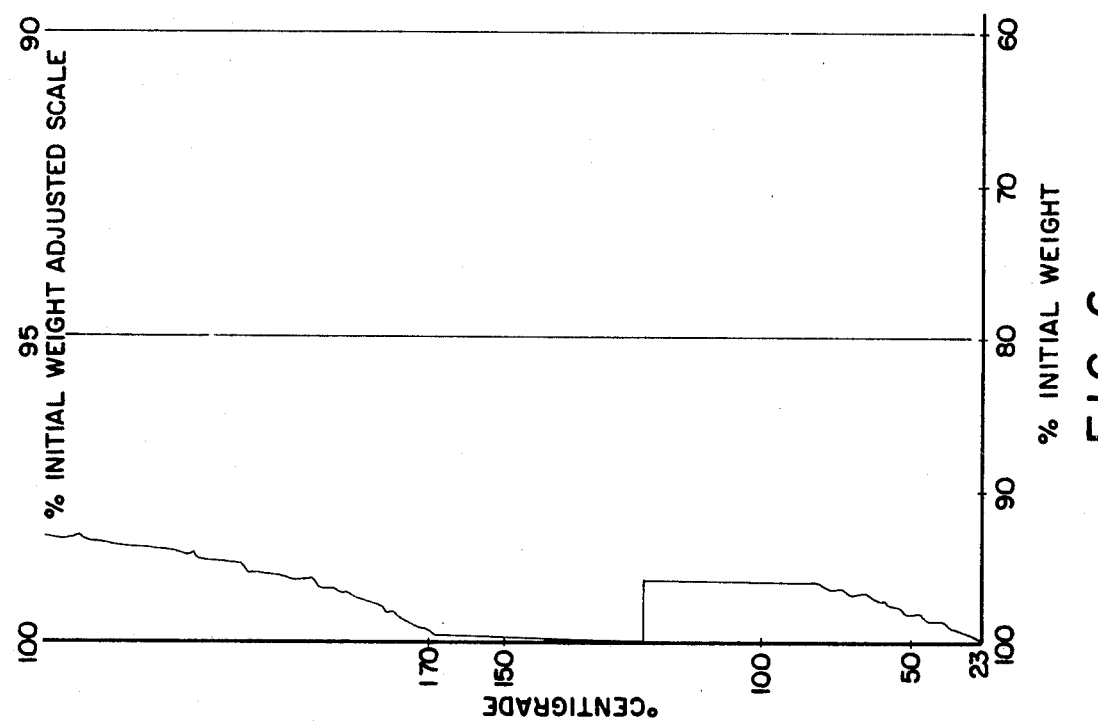
FIG. 6 is a thermogravametric analysis trace of another aminimide-substituted polymer within the scope of the present invention.

FIG. 6 is a thermogravimetric trace of polymer Fraction A. The polymer was dried as with Fraction B. However, since the weight loss due to deamination was so relatively small, the scale was readjusted as indicated at the top of the figure. Weight loss due to trimethylamine amounted to 2.3%.

The aminimide-substituted polymers of the present invention can also be employed to form cross-linked films. Referring to the above-indicated thermogravimetric techniques, it is believed that the amine elimination results in the formation of isocyanate groups which in turn react with an available hydroxyl group to form a urethane. The above described reaction is believed to occur as follows:

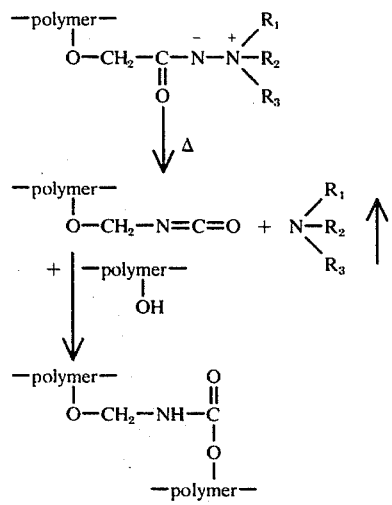

What is believed to have occurred when the polymer of Example 1 was heated is illustrated below:

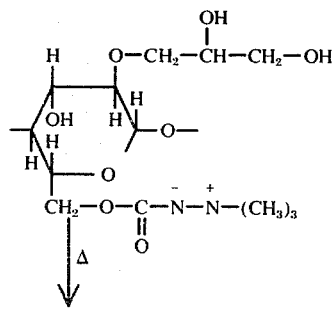

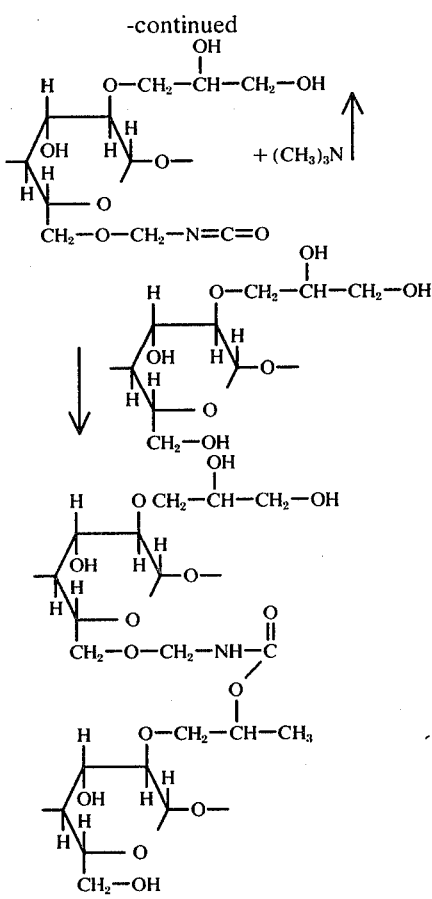

It should be understood, however, that the urethane linkage formed would not only be in that position. As with the aminimide substitution, any hdyroxyl group would be available for the reaction, either on another anhydroglucose unit or even on the same anhydroglucose unit.

The novel polymers of the present invention find utility in a variety of products. For example, the polymers are particularly suitable for uses as the viscosity increasing component of photographic processing compositions.

What is claimed is:

1. A novel composition of matter comprising a polymer containing a plurality of hydroxyl groups and having aminimide groups attached to said polymer through an ether linkage.

2. The product as defined in claim 1 wherein said aminimide group is represented by the formula:

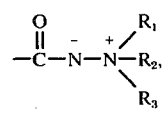

wherein each $R_1$, $R_2$ and $R_3$ are alkyl groups.

3. The product as defined in claim 1 wherein said polymer containing a plurality of hydroxyl groups is a cellulosic material.

4. The product as defined in claim 3 wherein said cellulosic material is hydroxypropyl cellulose.

5. The product as defined in claim 1 wherein said polymer containing a plurality of hydroxyl groups is polyvinyl alcohol.

6. The process for preparing a polyhydroxyl-containing polymer having aminimide groups attached thereto which comprises reacting a polymer containing a plurality of hydroxyl groups with a compound of the formula:

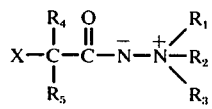

wherein each $R_1$, $R_2$ and $R_3$ are alkyl groups; X is chloro, iodo or bromo; and each $R_4$ and $R_5$ are hydrogen, lower alkyl or phenyl in an organic solvent for said polymer containing a plurality of hydroxyl groups and said compound.

7. The process as defined in claim 6 wherein said polymer containing a plurality of hydroxyl groups is swollen in said organic solvent prior to contact with said compound.

8. The process as defined in claim 6 wherein said polymer containing a plurality of hydroxyl groups is a cellulosic material.

9. The process as defined in claim 6 wherein said polymer containing a plurality of hydroxyl groups is polyvinyl alcohol.

10. The process as defined in claim 8 wherein said cellulosic material is hydroxypropyl cellulose; said solvent comprises t-butanol and said compound is trimethylamine chloroacetimide.

11. The process as defined in claim 10 wherein said solvent also includes dimethylformamide.

12. The process for preparing a cross-linked hydroxyl-containing polymer which comprises the deamination of a polymer containing a plurality of hydroxyl groups with aminimide groups grafted thereon through an ether linkage.

* * * * *

UNITED STATES PATENT OFFICE
CERTIFICATE OF CORRECTION

Patent No. 4,016,340        Dated April 5, 1977

Inventor(s) Henry S. Kolesinski et al.

It is certified that error appears in the above-identified patent and that said Letters Patent are hereby corrected as shown below:

Column 3, Formula D should appear as follows:

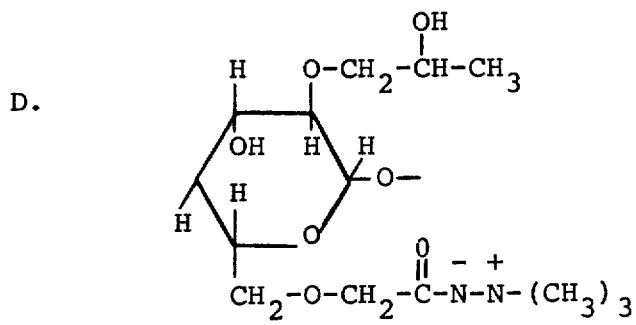

Column 5, that portion of the formula at line 59 reading

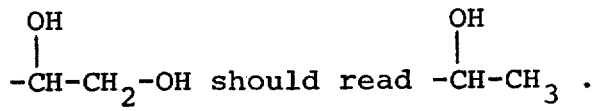

should read $$-\overset{OH}{\underset{|}{CH}}-CH_3 \, .$$

UNITED STATES PATENT OFFICE
CERTIFICATE OF CORRECTION

Patent No. 4,016,340              Dated April 5, 1977

Inventor(s) Henry S. Kolesinski et al.

It is certified that error appears in the above-identified patent and that said Letters Patent are hereby corrected as shown below:

Column 6, those portions of the formulae at lines 3, 11 and 19 reading $-\overset{\overset{\text{OH}}{|}}{\text{CH}}-\text{CH}_2-\text{OH}$ should read $-\overset{\overset{\text{OH}}{|}}{\text{CH}}-\text{CH}_3$.

Signed and Sealed this second Day of August 1977

[SEAL]

Attest:

RUTH C. MASON
Attesting Officer

C. MARSHALL DANN
Commissioner of Patents and Trademarks